US012798330B2

(12) United States Patent
Gaertner et al.

(10) Patent No.: US 12,798,330 B2
(45) Date of Patent: Nov. 17, 2026

(54) HEATING, VENTILATION AND/OR AIR CONDITIONING SYSTEM

(71) Applicant: VALEO KLIMASYSTEME GMBH, Bad Rodach (DE)

(72) Inventors: Stefan Gaertner, Bad Rodach (DE); Julian Ponsel, Bad Rodach (DE); Bodo Gesell, Bad Rodach (DE); Alexander Bauer, Bad Rodach (DE)

(73) Assignee: VALEO KLIMASYSTEME GmbH, Bad Rodach (DE)

( * ) Notice: Subject to any disclaimer, the term of this patent is extended or adjusted under 35 U.S.C. 154(b) by 363 days.

(21) Appl. No.: 18/578,717

(22) PCT Filed: Jul. 11, 2022

(86) PCT No.: PCT/EP2022/069291
§ 371 (c)(1),
(2) Date: Jan. 12, 2024

(87) PCT Pub. No.: WO2023/285361
PCT Pub. Date: Jan. 19, 2023

(65) Prior Publication Data

US 2024/0326555 A1 Oct. 3, 2024

(30) Foreign Application Priority Data

Jul. 13, 2021 (DE) ..................... 10 2021 118 042.2

(51) Int. Cl.
*B60H 1/00* (2006.01)
*F24F 13/22* (2006.01)

(52) U.S. Cl.
CPC ......... *B60H 1/00835* (2013.01); *F24F 13/22* (2013.01); *B60H 2001/00085* (2013.01)

(58) Field of Classification Search
CPC ............ B60H 1/00835; B60H 1/00849; B60H 2001/00085; F24F 13/22
See application file for complete search history.

(56) References Cited

U.S. PATENT DOCUMENTS 5,277,656 A * 1/1994 Koukal .................... B60H 1/28
454/147
8,002,615 B2 * 8/2011 Jeong .................. B60H 3/0616
454/156

(Continued)

FOREIGN PATENT DOCUMENTS

CN 1597379 A 3/2005
CN 202254147 U 5/2012

(Continued)

OTHER PUBLICATIONS

International Search Report issued in corresponding International Application No. PCT/EP2022/069291 mailed Oct. 21, 2022 (6 pages).

(Continued)

*Primary Examiner* — Allen R. B. Schult
(74) *Attorney, Agent, or Firm* — Osha Bergman Watanabe & Burton LLP

(57) ABSTRACT

The present invention relates to a heating, ventilation, and/or air conditioning system for a motor vehicle. The system includes a fresh air inlet, a movably mounted flap, and a water drainage channel. The movably mounted flap is assigned to the fresh air inlet and blocks an air flow through the fresh air inlet in a closed position and allows an air flow through the fresh air inlet in an open position. The water drainage channel at least partially extends on an outer side of the heating, ventilation, and/or air conditioning system along a lower edge of the fresh air inlet.

9 Claims, 6 Drawing Sheets

(56) References Cited

U.S. PATENT DOCUMENTS

Figure 1:
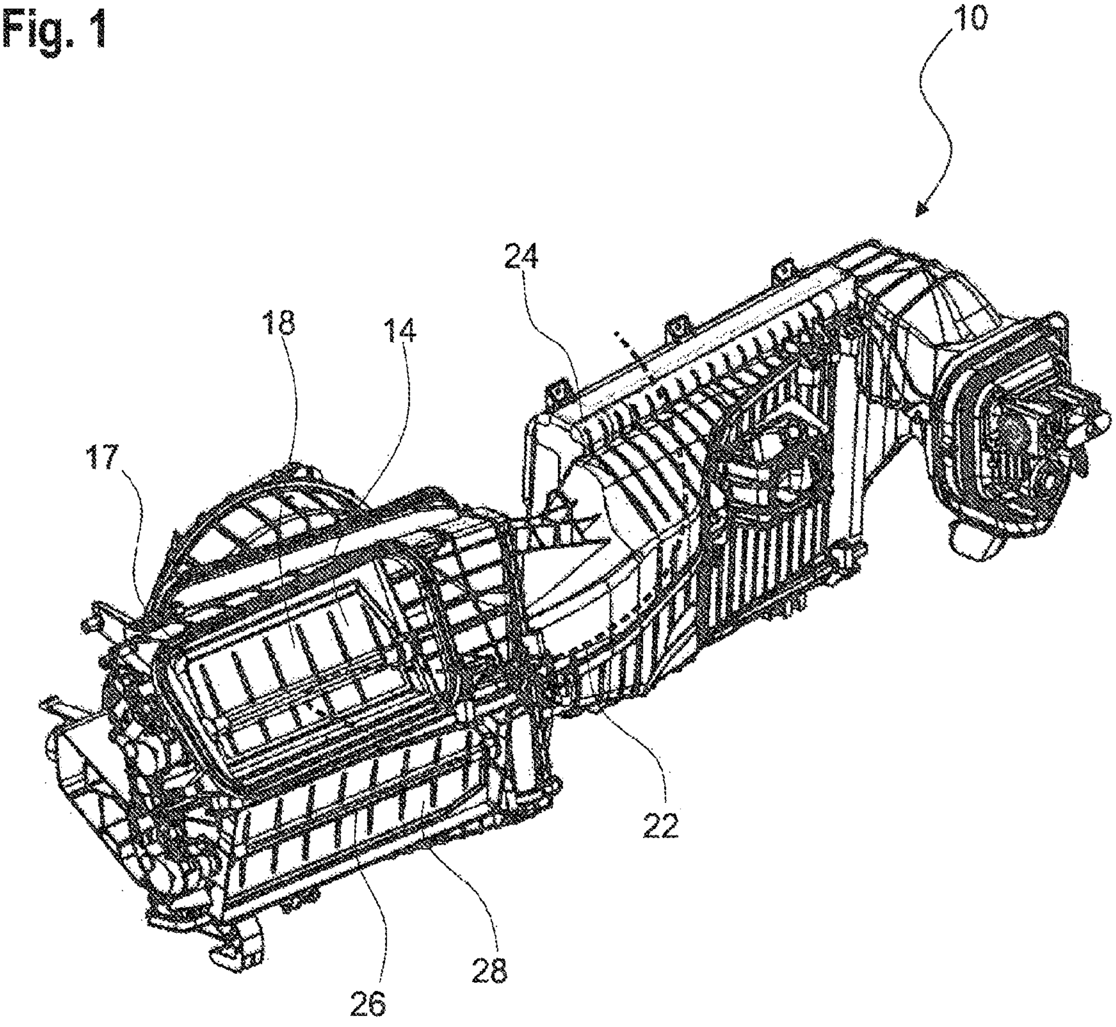

| | | | | |
|---|---|---|---|---|
| 10,569,621 | B2 * | 2/2020 | Santilli | B60H 1/00028 |
| 2017/0341484 | A1 | 11/2017 | Santilli et al. | |

FOREIGN PATENT DOCUMENTS

| | | | |
|---|---|---|---|
| CN | 105539064 | A | 5/2016 |
| CN | 206678736 | U | 11/2017 |
| CN | 111361512 | A | 7/2020 |
| CN | 211364206 | U | 8/2020 |
| DE | 102010062406 | A1 | 6/2012 |
| DE | 102014105896 | A1 | 10/2015 |
| DE | 102015107708 | A1 | 12/2015 |

OTHER PUBLICATIONS

Written Opinion issued in corresponding International Application No. PCT/EP2022/069291 mailed Oct. 21, 2022 (6 pages).

Office Action issued by the CNIPA for corresponding Chinese Patent Application No. 2022800492193, mailed Apr. 17, 2026 (11 pages).

* cited by examiner

HEATING, VENTILATION AND/OR AIR CONDITIONING SYSTEM

The invention relates to a heating, ventilation and/or air conditioning system for a motor vehicle.

Heating, ventilation and/or air conditioning systems are designed to generate one or more temperature-controlled air flows. In motor vehicles, such systems are used for ventilation and air conditioning of a vehicle interior.

For this purpose, firstly, an air flow is sucked in via a fresh air inlet by means of a fan, which air flow can subsequently be temperature-controlled by means of an evaporator and a heating device.

When the fresh air is sucked in, it can happen that not only air, but also water is sucked in, for example during rain or during a washing process. In addition, water can run into the heating, ventilation and/or air conditioning system even if the fan is not active when the fresh air inlet is open.

This creates the risk of water entering the fan or a filter arranged upstream of the evaporator, which may adversely impact the operation of the heating, ventilation and/or air conditioning system.

It is therefore an object of the invention to prevent water from entering the heating, ventilation and/or air conditioning system.

This object is achieved according to the invention by a heating, ventilation and/or air conditioning system for a motor vehicle, with a fresh air inlet, a movably mounted flap which is assigned to the fresh air inlet and blocks an air flow through the fresh air inlet in a closed position and allows an air flow through the fresh air inlet in an open position, and with a water drainage channel which at least partially extends on an outer side of the heating, ventilation and/or air conditioning system along a lower edge of the fresh air inlet.

The term "lower edge" refers to an installed state of the heating, ventilation and air conditioning system in a motor vehicle.

The water drainage channel allows water to be already drained from the environment of the fresh air inlet before the water can enter the fresh air inlet. It is particularly advantageous that water which accumulates in front of the flap when the flap is closed can be removed particularly quickly or that a situation can be avoided in which a relatively large amount of water accumulates in front of the flap at all. When the flap is opened, accumulated water could run into the heating, ventilation and/or air conditioning system/filter.

A situation is also avoided in which water stands over a prolonged period on a seal to the interior or to the engine compartment and water possibly enters at this location.

According to one embodiment, the heating, ventilation and/or air conditioning system comprises a filter which is arranged downstream of the fresh air inlet in a filter housing, wherein the water drainage channel is formed at least partially in the filter housing. This makes the heating, ventilation and/or air conditioning system particularly compact and reduces the number of components.

The water drainage channel can open into an interior of the heating, ventilation and/or air conditioning system starting from the portion extending on the outer side of the heating, ventilation and/or air conditioning system and extend further to a condensed water outlet. This ensures that water is not distributed in an uncontrolled manner, but is directed in a controlled manner via the water drainage channel to the condensed water outlet and is reliably discharged from the heating, ventilation and/or air conditioning system.

Preferably, the water drainage channel in the interior of the heating, ventilation and/or air conditioning system is fluidically separated from an air duct of the heating, ventilation and/or air conditioning system. This has the advantage that air or water which enters via the opening of the water drainage channel into the interior of the heating, ventilation and/or air conditioning system does not flow through the air conditioning system, but is discharged as quickly as possible. The opening of the water drainage channel into the interior can in particular not be closed so that, even with the flap closed, a small amount of water or air can always enter the heating, ventilation and/or air conditioning system via the water drainage channel. Owing to the fluidic separation, the operation of the heating, ventilation and/or air conditioning system is not influenced by water or air entering via the water drainage channel.

The fresh air inlet is, for example, surrounded by an air inlet flange which covers the water drainage channel, wherein a gutter, in which inlet openings to the water drainage channel are provided, is formed in the air inlet flange. By covering the water drainage channel, the advantage is achieved that relatively large dirt particles, especially leaves, are retained in the gutter. This will prevent the water drainage channel from becoming clogged.

Preferably, a cross section of the gutter tapers toward the inlet openings, in particular in the form of a funnel. In this way, water can be collected particularly well in the water drainage channel.

According to one embodiment, a further water drainage channel in an interior of the heating, ventilation and/or air conditioning system extends along a lower edge of the fresh air inlet. This means that water which enters via the fresh air inlet despite the presence of the outer water drainage channel can also be quickly removed. In particular, a situation is avoided in which the water penetrates deeper into the heating, ventilation and/or air conditioning system and reaches the filter.

For example, the two water drainage channels extend parallel at least in sections.

Downstream of the opening of the water drainage channel into the interior, the two water drainage channels continue as a common channel, for example. In other words, the further water drainage channel can open after the opening into the first water drainage channel. This also contributes to a compact design of the heating, ventilation and/or air conditioning system, since at least in some sections only one water drainage channel is required.

A further air inlet can be provided which is arranged in a vehicle interior, wherein the air inlet is also assigned a movably mounted flap which blocks an air flow through the air inlet in a closed position and allows an air flow through the air inlet in an open position. The further air inlet is used to recirculate the air from the vehicle interior and is arranged, for example, in the footwell.

A web is preferably provided in the interior of the heating, ventilation and/or air conditioning system between the fresh air inlet and the further air inlet and limits a direct air flow from the fresh air inlet to the further air inlet. The web is intended to prevent fresh air which enters through the fresh air inlet from flowing directly through the further air inlet into the vehicle interior without first being air-conditioned in the heating, ventilation and/or air conditioning system. Especially at low outside temperatures, it would be unpleasant for a vehicle occupant if, for example, cold fresh air flows into the footwell. In particular, an increased flow resistance from the fresh air inlet to the further air inlet is achieved by the web.

In addition, the web also prevents water that has penetrated from being able to flow directly into the footwell.

The further water drainage channel is formed in particular in the web and a plurality of ribs are formed within the water drainage channel. The ribs ensure an increased flow resistance. In other words, the ribs have a throttling effect and ensure an increased counterpressure. Without the ribs, a certain amount of air could flow into the footwell despite the web as a result of an air pressure built up in front of the flap.

The ribs are designed in such a way that water can flow off unimpeded through the water drainage channel.

Starting from the air inlet, an air duct can run to an evaporator of the heating, ventilation and/or air conditioning system. This allows air conditioning of the air which has flowed through the fresh air flap.

Figure 2:
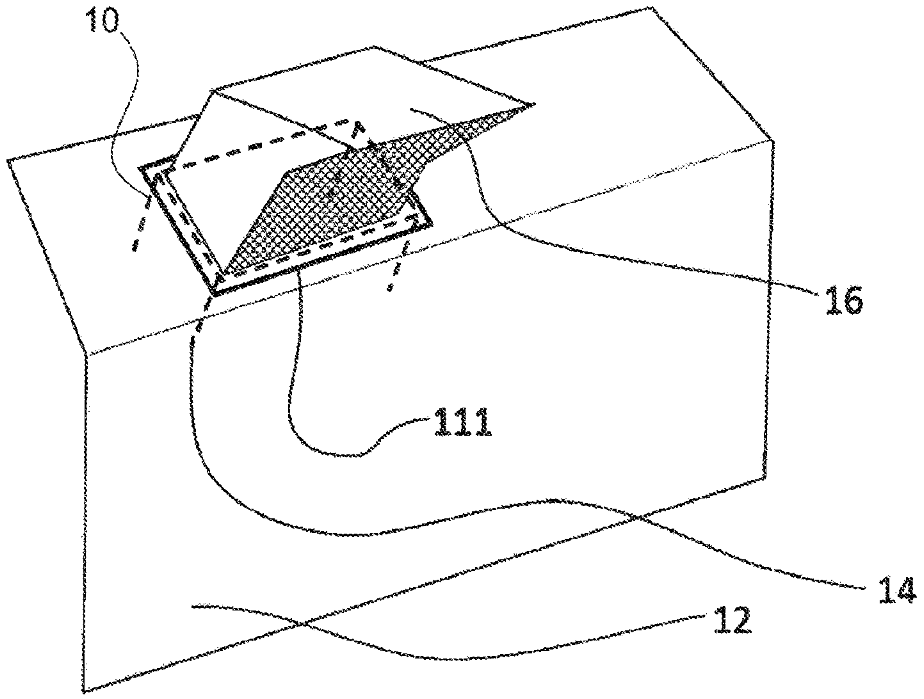
Figure 3:
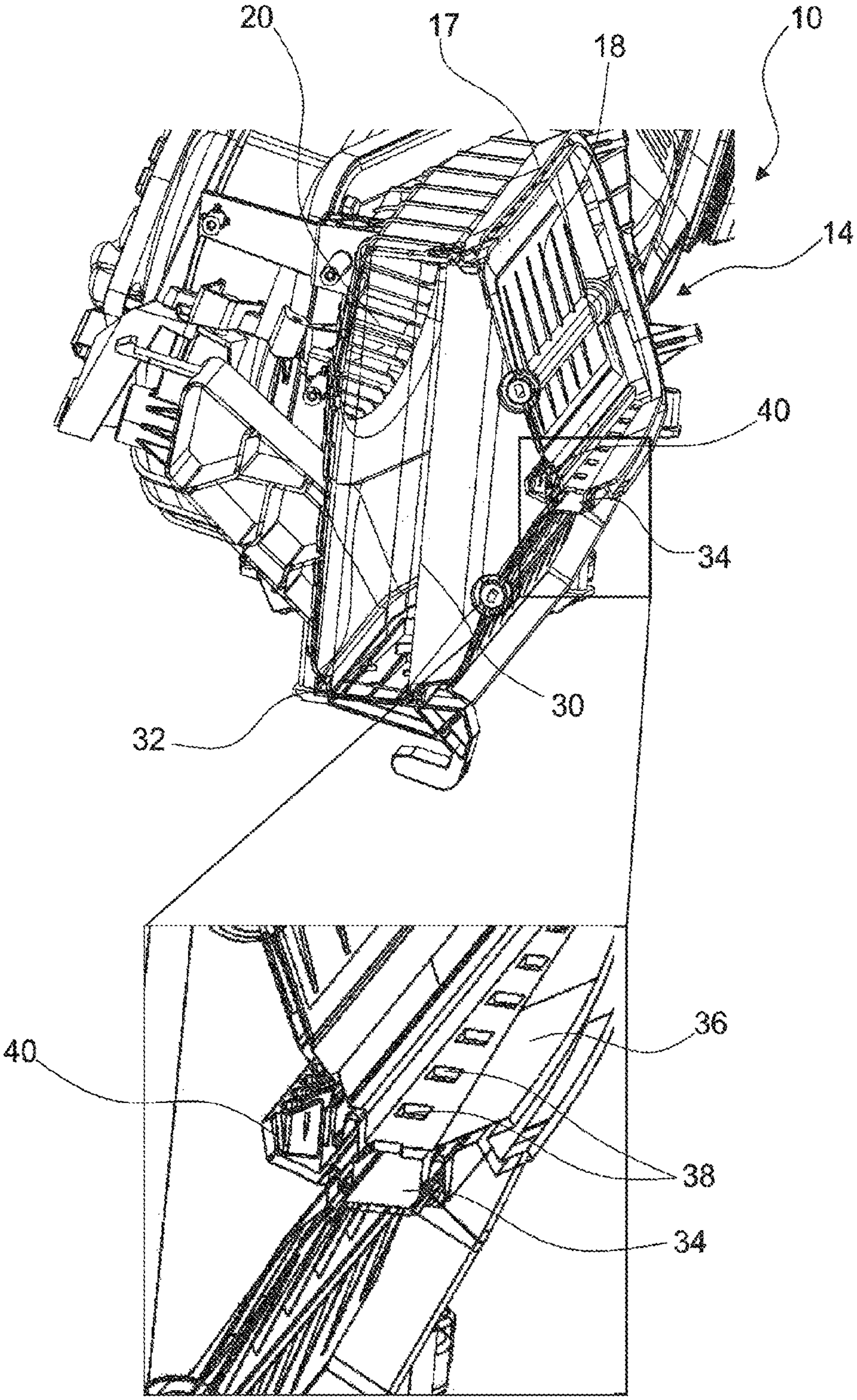
Figure 4:
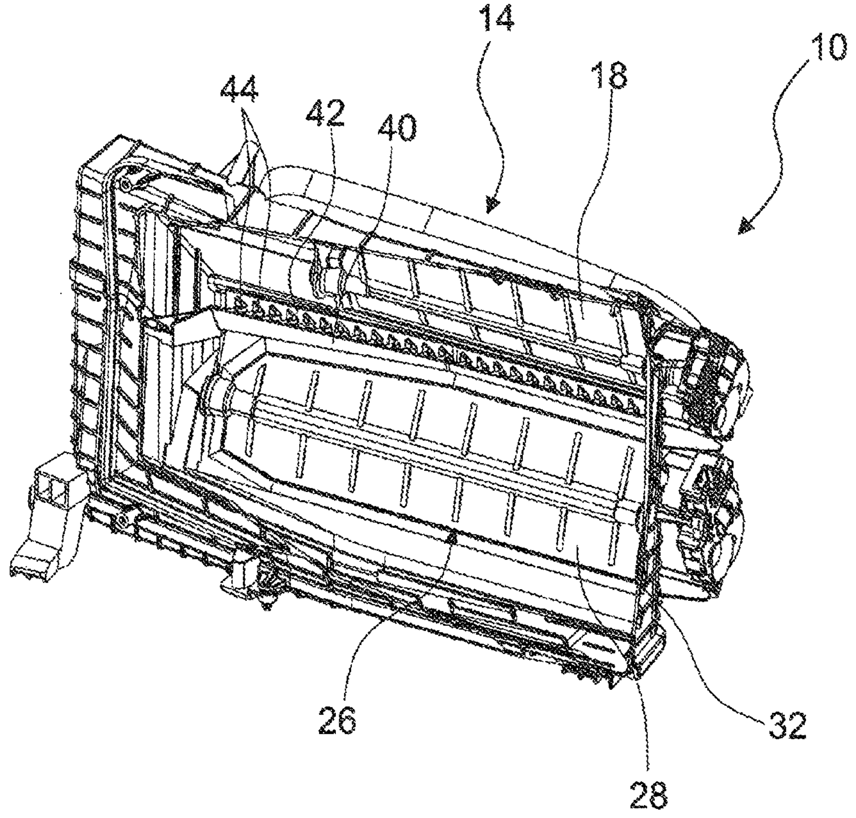
Figure 5:
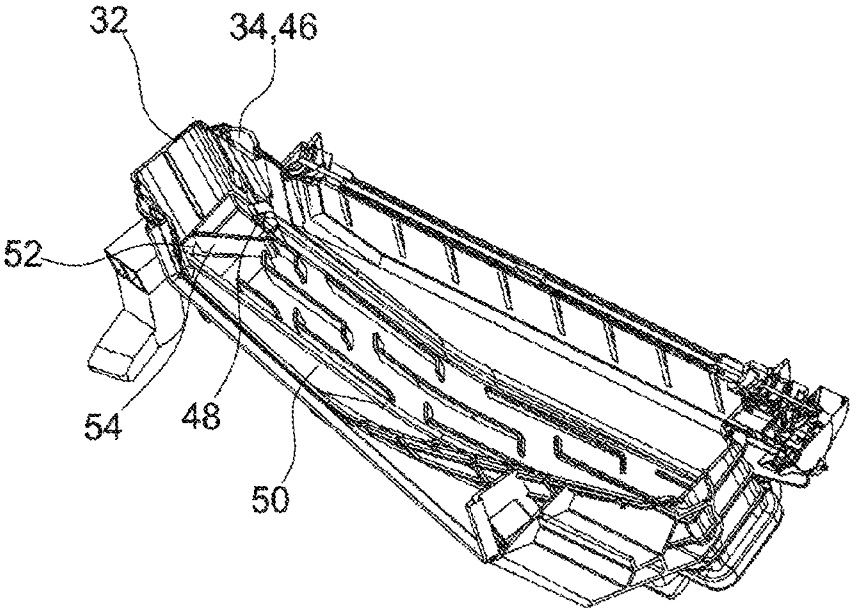
Figure 6:
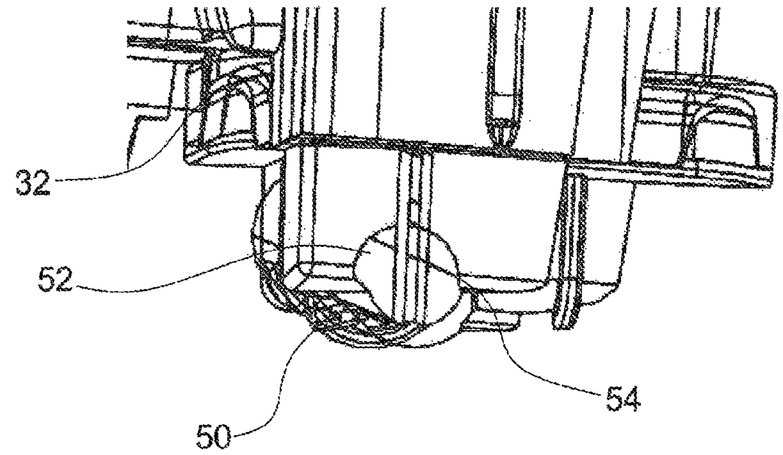
Figure 7:
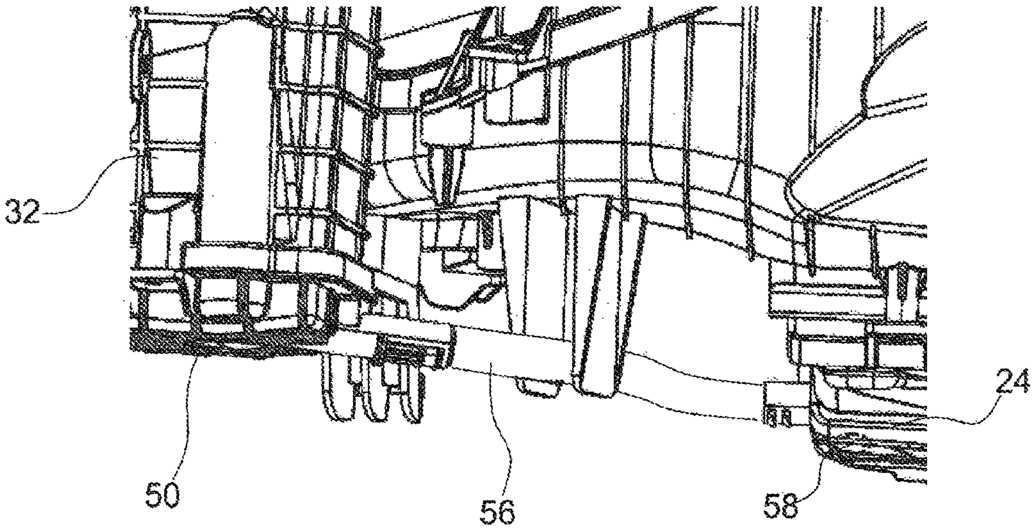
Figure 8:
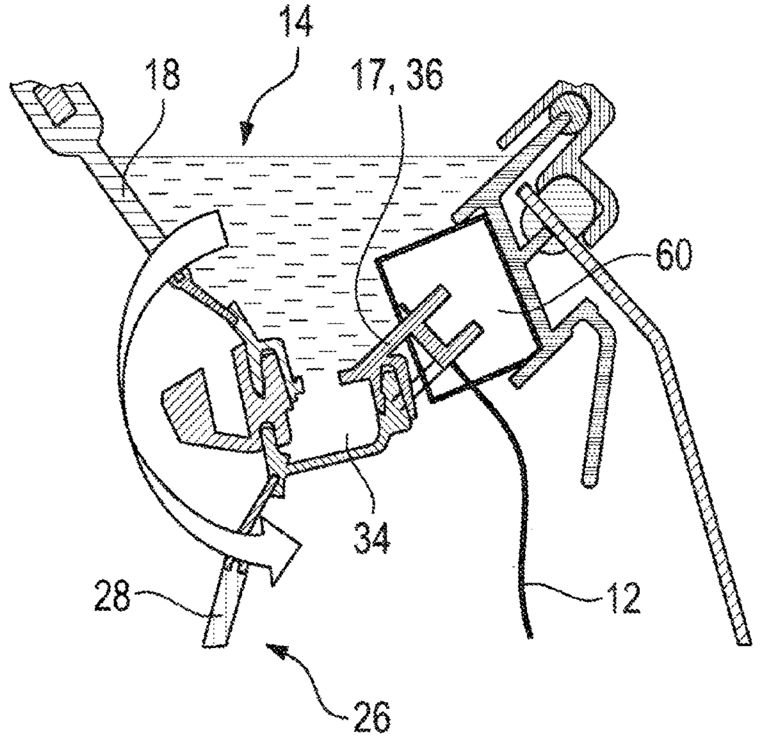
Figure 9:
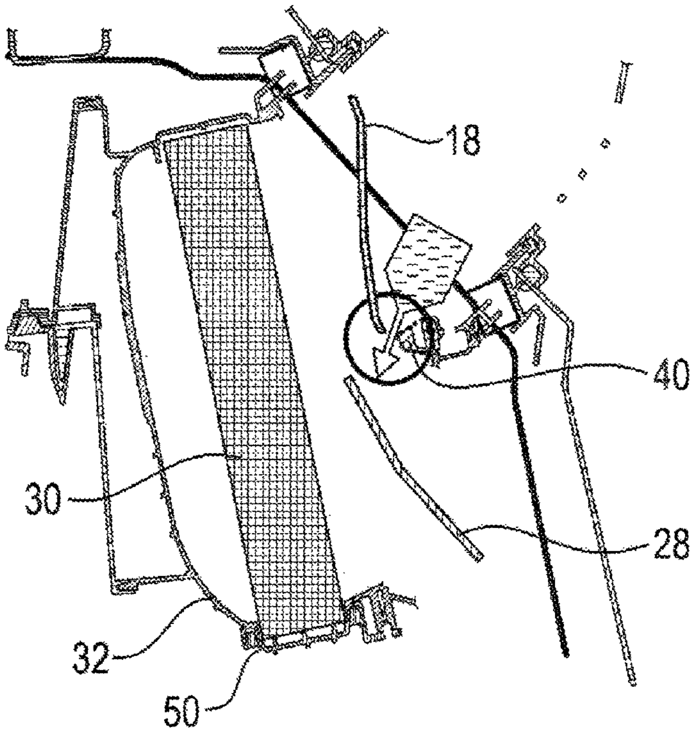

Further advantages and features of the invention can be found in the following description and in the accompanying drawings to which reference is made. In the drawings:

FIG. 1 shows part of a heating, ventilation and/or air conditioning system according to the invention, FIG. 2 schematically shows the heating, ventilation and/or air conditioning system from FIG. 1 in an installation space environment, FIG. 3 shows a perspective sectional representation of the heating, ventilation and/or air conditioning system from FIG. 1, FIG. 4 shows an inner view of the heating, ventilation and/or air conditioning system from FIG. 1, FIG. 5 shows a cross section through a filter housing of the heating, ventilation and/or air conditioning system from FIG. 1, FIG. 6 shows an outlet opening in a bottom of the filter housing, FIG. 7 shows a portion of a water drainage channel, FIG. 8 shows a sectional representation in the region of a water drainage channel of the heating, ventilation and/or air conditioning system from FIG. 1, and FIG. 9 shows a sectional representation in the region of a fresh air inlet of the heating, ventilation and/or air conditioning system from FIG. 1.

FIG. 1 shows a heating, ventilation and/or air conditioning system 10 for a motor vehicle, wherein an air guide unit of the heating, ventilation and/or air conditioning system 10 is not illustrated.

In FIG. 2, the heating, ventilation and/or air conditioning system 10 is shown in an installed state in a vehicle environment, wherein the heating, ventilation and/or air conditioning system 10 in FIG. 2 is for the most part concealed by an end wall 12, which is schematically illustrated in FIG. 2. Only a fresh air inlet 14 of the heating, ventilation and/or air conditioning system 10 can be seen in FIG. 2.

At the fresh air inlet 14, an at least partially grid-shaped cover 16 is arranged and serves to keep coarse dirt, for example leaves, away from the fresh air inlet 14.

The fresh air inlet 14 is also surrounded by a frame 111. The frame 111 is used, inter alia, to align the cover 16.

As can be seen in FIG. 1, the fresh air inlet is assigned a movably mounted flap 18 which blocks an air flow through the fresh air inlet 14 in a closed position and allows an air flow through the fresh air inlet 14 in an open position.

The fresh air is sucked in by means of a fan 20 (see FIG. 3).

Starting from the fresh air inlet 14, an air duct 22 runs to an evaporator of the heating, ventilation and/or air conditioning system 10. The evaporator is concealed in FIG. 1 by an evaporator housing 24.

The air duct 22 is formed in particular by various housing walls of the heating, ventilation and/or air conditioning system 10. For illustration, a course of the air duct 22 is shown roughly schematically in FIG. 1 by means of a dashed line.

In addition to the fresh air inlet 14, a further air inlet 26 is provided which is arranged in a vehicle interior, in particular in a footwell.

The air inlet 26 is also assigned a movably mounted flap 28 which blocks an air flow through the air inlet 26 in a closed position and allows an air flow through the air inlet 26 in an open position.

A filter 30, which is shown transparently in FIG. 3, is arranged downstream of the fresh air inlet 14 and upstream of the evaporator.

The filter 30 is received in a filter housing 32.

The filter 30 is used to clean the fresh air before it enters the vehicle interior.

However, not only the ingress of dirt, but also the ingress of water into the heating, ventilation and/or air conditioning system 10 should be prevented.

Water can enter, for example, if the flap 18 is open during rain or during vehicle washing. Furthermore, it is possible that water accumulates in front of the flap 18 when it is closed and runs into the vehicle interior when the flap 18 is opened.

In order to avoid this, a water drainage channel 34 is present which at least partially extends on an outer side of the heating, ventilation and/or air conditioning system 10 along a lower edge of the fresh air inlet 14.

A portion of the water drainage channel 34 can be seen in FIG. 3, which shows a perspective sectional representation of the heating, ventilation and/or air conditioning system 10.

The water drainage channel 34 extends over the full width of the fresh air inlet 14.

In particular, the water drainage channel 34 directly adjoins the fresh air inlet 14.

The water drainage channel 34 is formed in sections in the filter housing 32.

The air inlet flange 17, which surrounds the fresh air inlet 14, covers the water drainage channel 34 in a region along the fresh air inlet 14.

A gutter 36, in which inlet openings 38 to the water drainage channel 34 are provided, is formed in the air inlet flange 17.

The air inlet flange 17 thus forms a cover for the water drainage channel 34 without impeding water drainage.

The gutter 36 tapers toward the water drainage channel 34.

A web 40 is present in the interior of the heating, ventilation and/or air conditioning system 10 between the fresh air inlet 14 and the further air inlet 26 and limits a direct air flow from the fresh air inlet 14 to the further air inlet 26.

FIG. 4 shows an inner view of the heating, ventilation and/or air conditioning system 10 in the region of the air inlets 14, 26.

In this view, it can be seen that a further water drainage channel 42 is present which extends in the interior of the heating, ventilation and/or air conditioning system 10 along a lower edge of the fresh air inlet 14.

The further water drainage channel 42 is formed in the web 40, which contributes to a compact design.

A plurality of ribs 44 are optionally formed in the water drainage channel 42 or in the web 40.

The ribs 44 are jagged in the exemplary embodiment shown. Other shapes, however, are also conceivable.

The ribs 44 ensure an increased flow resistance between the fresh air inlet 14 and the further air inlet 26, so that an air flow from the fresh air inlet 14 to the further air inlet 26 is made difficult.

In the following, a course of the water drainage channels 34, 42 is described in more detail with reference to FIGS. 4 to 7.

The first water drainage channel 34 opens into the interior of the heating, ventilation and/or air conditioning system 10 starting from the portion extending on the outer side of the heating, ventilation and/or air conditioning system 10.

More specifically, a portion of the water drainage channel 34 is formed by a circumferentially closed channel 46 in the filter housing 32. This emerges from FIG. 5, which shows a cross section through the filter housing 32, so that an interior of a bottom pan 50 of the filter housing 32 can be seen.

The channel 46 has an outlet opening 48 into the bottom pan 50 of the filter housing 32.

In the bottom pan 50, the water drainage channel 34 continues to an outlet opening 52 in the bottom pan 50.

A partition wall 54, which delimits the water drainage channel 34, is formed in the bottom pan 50.

The partition wall 54 subdivides the outlet opening 52 into two regions, wherein the water drainage channel 34 is assigned only one region and the further region is assigned to the air duct 22 of the heating, ventilation and/or air conditioning system 10 and to the water drainage channel 42.

The subdivision of the outlet opening 52 by the partition wall 54 is particularly well visible in FIG. 6.

By virtue of the partition wall 54 and the circumferentially closed channel 46 and the filter 30, the water drainage channel 34 in the interior of the heating, ventilation and/or air conditioning system 10 is fluidically separated from the air duct 22 of the heating, ventilation and/or air conditioning system 10.

Connected to the outlet opening 52 is a line 56 (see FIG. 7) in which the water drainage channel 34 and the water drainage channel 42 continue and which runs to a condensed water outlet 58.

The condensed water outlet 58 is preferably formed in a bottom of the evaporator housing 24. In FIG. 7, the condensed water outlet 58 is illustrated by way of example. However, the condensed water outlet 58 does not have to be situated at the position shown in FIG. 7. Usually, the condensed water outlet 38 is arranged at a lowest point in the evaporator housing 24 in the installation position, so that water can flow off particularly well.

The further water drainage channel 42 extends downward starting from the fresh air inlet 14 on the filter housing 32, in particular along the outside of the channel 46.

FIG. 8 illustrates, by way of a sectional representation, a scenario which is to be avoided according to the invention.

More specifically, FIG. 8 shows a state of the heating, ventilation and/or air conditioning system 10 in which the fresh air inlet 14 is completely closed by the flap 18 and water has accumulated in the region in front of the fresh air inlet 14.

As a result, water stands on a seal 60, which seals an interior to the outside. If this state persists for a relatively long period of time, there is the risk that water will enter the interior despite the presence of the seal 60.

Furthermore, upon opening the flap 18, water would run into an interior of the heating, ventilation and/or air conditioning system 10, which is also disadvantageous.

The presence of the water drainage channel 34 can avoid such a scenario.

FIG. 9 further schematically illustrates how, with open flaps 18, 28, a flow resistance is increased by the web 40.

The invention claimed is:

1. A heating, ventilation and/or air conditioning system for a motor vehicle, the system comprising:
- a fresh air inlet;
- a movably mounted flap,
  - wherein the flap is assigned to the fresh air inlet and blocks an air flow through the fresh air inlet in a closed position and allows an air flow through the fresh air inlet in an open position; and
- a water drainage channel,
  - wherein the water drainage channel at least partially extends on an outer side of the heating, ventilation and/or air conditioning system along a lower edge of the fresh air inlet,
- wherein a further air inlet is arranged in a vehicle interior,
- wherein the further inlet is assigned a movably mounted flap which blocks an air flow through the further air inlet in a closed position and allows an air flow through the further air inlet in an open position, and
- wherein a web is provided in the interior of the heating, ventilation and/or air conditioning system between the fresh air inlet and the further air inlet and limits a direct air flow from the fresh air inlet to the further air inlet.

2. The heating, ventilation and/or air conditioning system as claimed in claim 1,
- wherein the heating, ventilation and/or air conditioning system comprises a filter which is arranged downstream of the fresh air inlet in a filter housing,
- wherein the water drainage channel is formed at least partially in the filter housing.

3. The heating, ventilation and/or air conditioning system as claimed in claim 1,
- wherein water drainage channel opens into an interior of the heating, ventilation and/or air conditioning system starting from the portion extending on the outer side of the heating, ventilation and/or air conditioning system and further extends to a condensed water outlet.

4. The heating, ventilation and/or air conditioning system as claimed in claim 3,
- wherein the water drainage channel in the interior of the heating, ventilation and/or air conditioning system is fluidically separated from an air duct of the heating, ventilation and/or air conditioning system.

5. The heating, ventilation and/or air conditioning system as claimed in claim 1,
- wherein the fresh air inlet is surrounded by an air inlet flange which covers the water drainage channel,
- wherein a gutter, in which inlet openings to the water drainage channel are provided, is formed in the air inlet flange.

6. The heating, ventilation and/or air conditioning system as claimed in claim 5, wherein a cross section of the gutter tapers toward the inlet openings.

7. The heating, ventilation and/or air conditioning system as claimed in claim 1,
- wherein a further water drainage channel in an interior of the heating, ventilation and/or air conditioning system extends along a lower edge of the fresh air inlet.

8. The heating, ventilation and/or air conditioning system as claimed in claim 7,
- wherein the further water drainage channel is formed in the web, and
- wherein a plurality of ribs are formed within the water drainage channel.

9. The heating, ventilation and/or air conditioning system as claimed in claim 1, wherein, starting from the fresh air inlet, an air duct runs to an evaporator of the heating, ventilation and/or air conditioning system.

* * * * *